Nov. 10, 1959  A. L. LEE  2,912,184
MINE HAULAGE VEHICLE
Original Filed Aug. 31, 1951  5 Sheets-Sheet 1
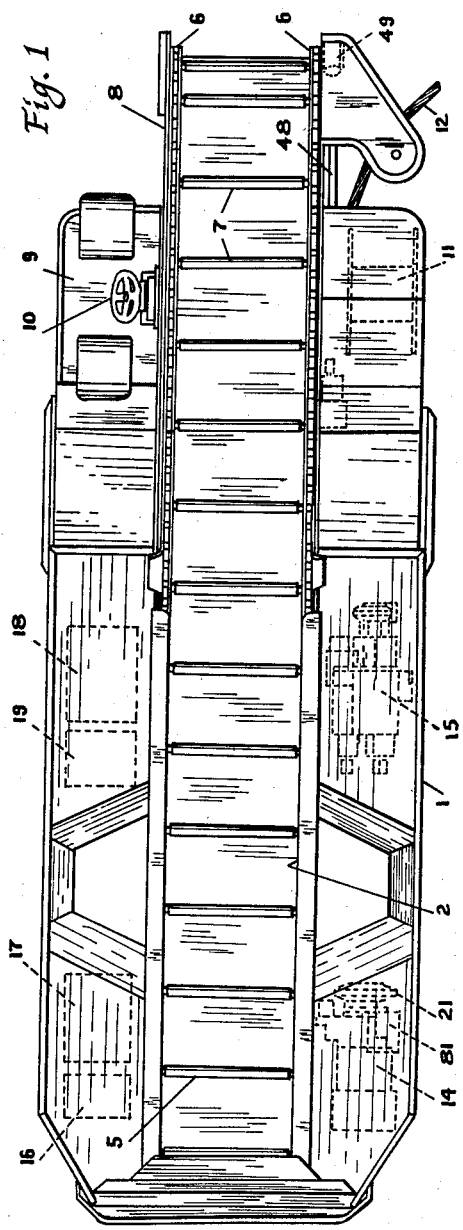
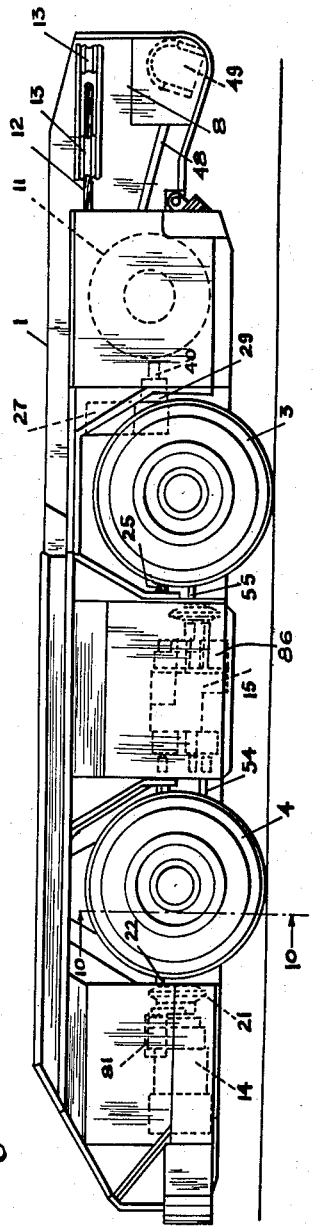
INVENTOR.
Arthur L. Lee
BY
ATTORNEY

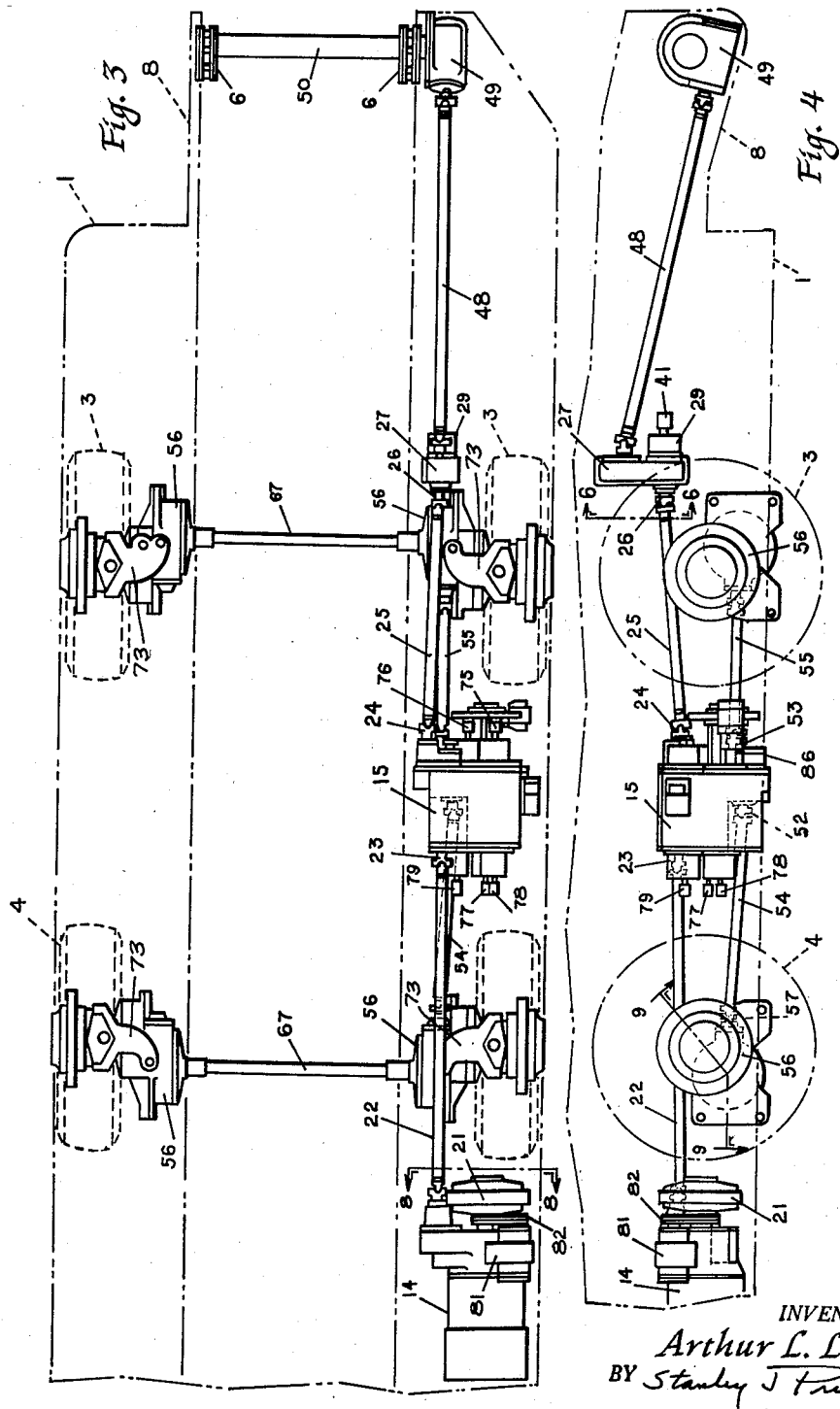

Nov. 10, 1959   A. L. LEE   2,912,184
MINE HAULAGE VEHICLE
Original Filed Aug. 31, 1951   5 Sheets-Sheet 3
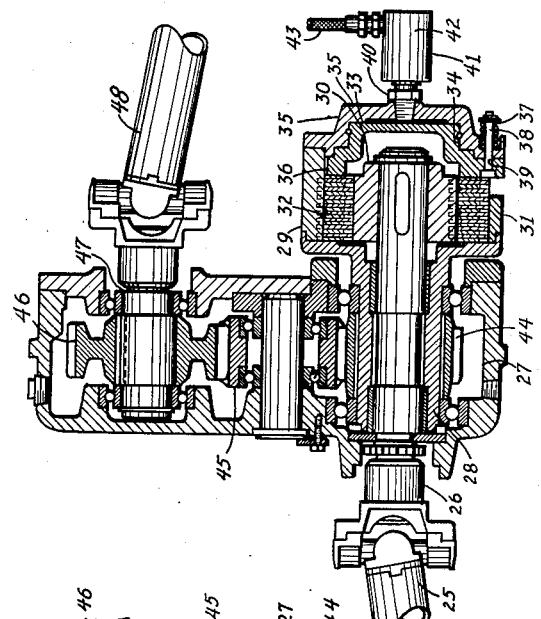
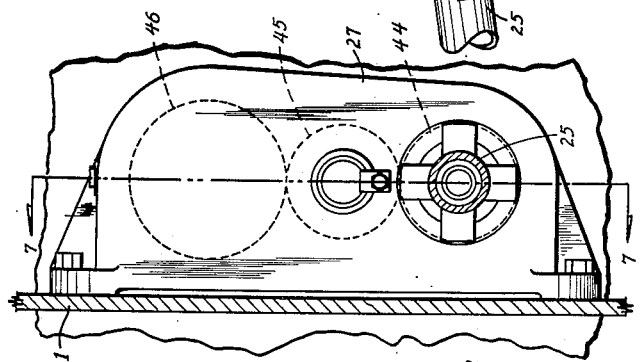
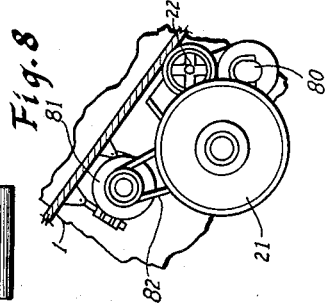
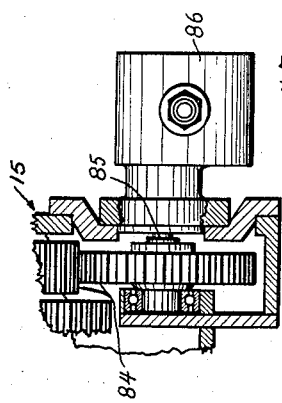
INVENTOR.
Arthur L. Lee
BY Stanley J Price Jr.
ATTORNEY Nov. 10, 1959　　　　　A. L. LEE　　　　　2,912,184
MINE HAULAGE VEHICLE
Original Filed Aug. 31, 1951　　　　　5 Sheets-Sheet 4
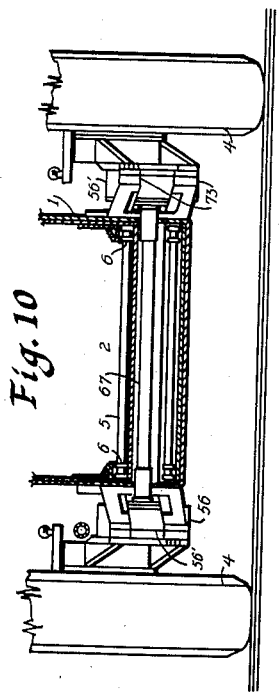
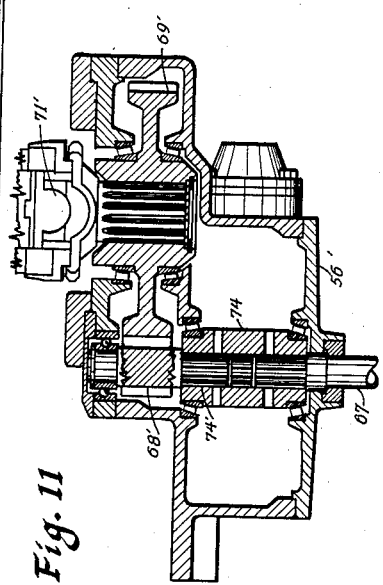
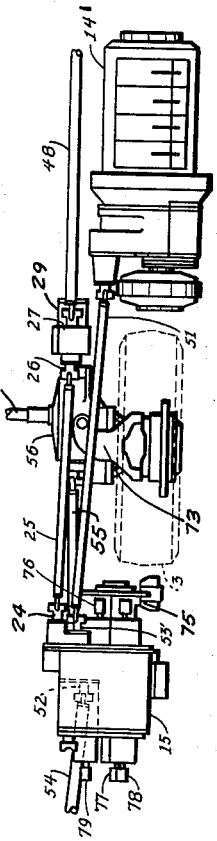
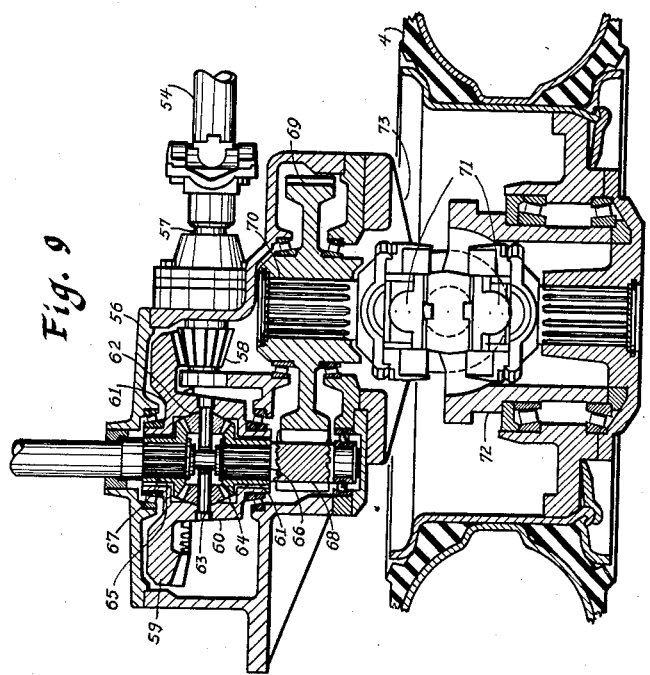
INVENTOR.
Arthur L. Lee
BY Stanley J Price
ATTORNEY

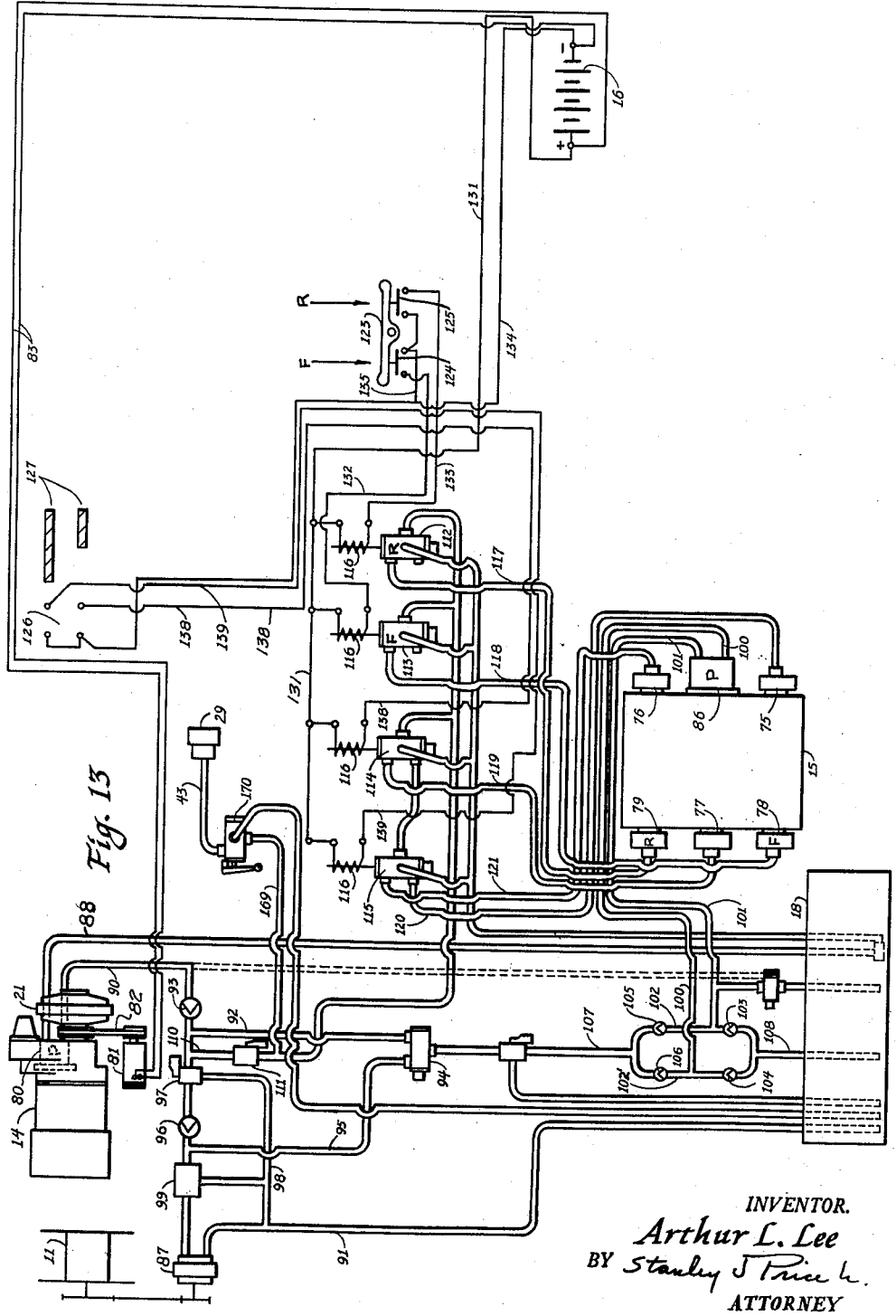

United States Patent Office 2,912,184
Patented Nov. 10, 1959

2,912,184

MINE HAULAGE VEHICLE

Arthur L. Lee, Columbus, Ohio, assignor to Consolidation Coal Company, a corporation of Pennsylvania Original application August 31, 1951, Serial No. 244,549, now Patent No. 2,754,015, dated July 10, 1956. Divided and this application September 22, 1955, Serial No. 535,920

10 Claims. (Cl. 242—86.51)

This invention relates to automotive vehicles and more particularly to a mine haulage vehicle of the type commonly known as a "shuttle car" especially designed for use in hauling loose material in underground mines.

The present application is a division of my copending application Serial No. 244,549 now Patent No. 2,754,015 filed August 31, 1951 and assigned to the assignee of the present invention.

An object of the present invention is to provide an improved automotive vehicle. Another object is to provide an improved mine haulage vehicle of the type commonly known as a "shuttle car" having novel features of construction. Another object is to provide an improved mine haulage vehicle having certain of its elements operated by liquid under pressure and having novel means associated therewith for generating liquid under pressure. A further object is to provide an auxiliary pump operating only when the vehicle is traveling and driven by the driving connections between the prime mover and the vehicle wheels whereby a supplemental source of liquid under pressure may be provided while the vehicle is in motion and the liquid pressure demand is greater. A still further object is to provide improved liquid pressure generating means whereby a relatively small volume of liquid may be provided while the vehicle is stationary and a supplemental supply of liquid under pressure is made available while the vehicle is traveling and the liquid pressure demands are relatively high, thereby eliminating the need of by-passing a relatively large volume of liquid, with its inherent power losses, while the vehicle is stationary and when only a relatively small volume of liquid pressure is needed. These and other objects and advantages of the invention will, however, hereinafter more fully appear.

In the accompanying drawings there is shown for purposes of illustration one form which the invention may assume in practice.

In these drawings:

Fig. 1 is a plan view and Fig. 2 is a side elevational view of a mine haulage vehicle in which a preferred illustrative form of the invention is embodied.

Fig. 3 is a somewhat schematic view with the vehicle body in outline and showing portions of the driving means for the traction wheel and the conveyor.

Fig. 4 is a schematic side view, similar to Fig. 3, showing the vehicle in side elevation.

Fig. 5 is an enlarged detail section taken through the auxiliary pump driven through the vehicle-transmission.

Fig. 6 is an enlarged detail transverse vertical section taken on line 6—6 of Fig. 4, showing a portion of the conveyor drive.

Fig. 7 is a detail longitudinal vertical section taken on line 7—7 of Fig. 6.

Fig. 8 is a detail transverse vertical section taken on line 8—8 of Fig. 3, showing a portion of the drive.

Fig. 9 is an enlarged developed section taken substantially on the planes of line 9—9 of Fig. 4, showing details of the drive for one of the traction wheels.

Fig. 10 is an enlarged fragmentary cross section taken on line 10—10 of Fig. 2.

Fig. 11 is a detail section taken on the plane of Fig. 9, showing the drive for an opposite traction wheel.

Fig. 12 is a fragmentary view of a portion of the structure shown in Fig. 3, illustrating the connection with an alternate power source.

Fig. 13 is a diagrammatic view illustrating the hydraulic and electric systems.

The several features of the invention, as shown in the drawings, are embodied in a mine haulage vehicle of the kind commonly known as a "shuttle car" especially designed for use in transferring loose material in underground mines, and while such features are especially adapted to use with such a vehicle they are also adapted to use with automotive vehicles of other types.

The mine haulage vehicle disclosed herein generally comprises a body 1 having a material receiving compartment 2 and mounted on pairs of front and rear traction and steering wheels 3 and 4, with the compartment 2 extending longitudinally between the wheels in the manner shown in Figs. 1 and 10. Extending along the bottom of the compartment is a conventional endless flight conveyor 5 having endless side chains 6 suitably guided within guideways within the body and to which usual cross flights 7 are connected. The discharge end of the conveyor extends along a tiltable end frame 8 which is tiltable to effect variation in the discharge height of the conveyor. Arranged at one side of the discharge end of the vehicle body is a compartment 9 which provides a station for the operator and which has therein a steering wheel 10 and other conveniently arranged controls whereby the vehicle may be operated and steered. Arranged at the opposite side of the discharge end of the body is a conventional electric cable reel 11 on which a power conductor cable 12 is wound, and the tiltable end frame 8 carries suitable guides 13 for the cable, whereby the latter may be extended in various directions from the vehicle into a connection with a suitable source of electric power such as a main power line. Arranged at one side of the opposite end of the body is an electric motor 14 which may be either of the A.C. or D.C. type. Arranged at the same side of the body, between the front and rear wheels, is a selective multi-speed automotive transmission 15. Located at the side of the body opposite from the motor 14 is a storage battery 16 and an electric control apparatus 17, while arranged between the front and rear wheels at this side of the body is a liquid tank 18 and a control valve apparatus 19, both associated with the selective multi-speed transmission 15 as later explained. In the event a diesel engine is employed in lieu of the electric motor 14, the cable reel 11 may be omitted and the diesel engine may be placed in the space previously occupied by the cable reel. A fuel tank for the diesel engine is substituted for the electric control apparatus 17, in the space provided.

Now referring to the conveyor and wheel drives of the vehicle it will be noted that the motor 14 is connected through a coupling or clutch 21 to a universal shafting 22 extending longitudinally within the body at one side of the compartment and this shafting is, in turn, connected to the input shaft 23 of the selective transmission. An output shaft 24 of the transmission is connected by universal shafting 25 to a shaft 26 (see Fig. 7) of a reduction gearing contained in a housing 27 suitably mounted on the adjacent side of the vehicle body. As illustrated, the shaft 26 is arranged coaxial with and is journaled centrally within a hollow shaft 28 which is suitably journaled within the the gear housing 27. The hollow shaft 28 is connectible to the inner shaft 26 by a friction clutch 29 which includes an inner member 30 keyed to the inner shaft and an outer rotatable casing 31 secured to the outer hollow shaft 28. The member 30 and the casing 31 carry interleaved clutch discs or plates 32 which, when pressed together, serve frictionally to connect the shafts for rotation in unison. An annular piston 33 is received in a cylinder bore 34 formed within an end closure 35 of the rotatable casing 31, and this piston is secured to a clutch operating element 36, as illustrated. The clutch operating element is normally held retracted by coil springs 37 which act on bolts 38 passing through openings 39 in the casing and engaging the clutch operating element. The end closure 35 has an element 40 of a conventional fluid swivel 41 connected thereto, and an outer element 42 of the swivel is coupled to a fluid conduit 43. Thus, liquid under pressure may flow through the conduit 43 and through the swivel to the cylinder bore 34 to act on the piston 33 of the clutch operating element 36 to move the latter inwardly against the action of the springs 37 to effect loading of the clutch discs. When the cylinder bore is suitably vented the springs may retract the operating element 36 to release the clutch.

Secured to the outer shaft 28 is a spur gear 44 meshing with a spur gear 45 which in turn meshes with and drives a spur gear 46 secured to a parallel shaft 47 likewise suitably journaled in the housing 27. This shaft is connected by universal drive shafting 48 to a conventional speed reducer 49 which drives a cross shaft 50 suitably journaled within the tiltable end frame 8. Chain sprockets suitably secured to this cross shaft engage and drive the endless side chains 6 of the conveyor. The universal shafting 48 permits tilting of the end frame 8 of the vehicle, to adjust the discharge end of the conveyor, while maintaining the drive. When a diesel engine is employed, as designated at 14' in Fig. 12, it is connected by universal shafting 51 to an input shaft 53' of the transmission.

Output shafts 52 and 53 are driven by the terminal element of the selective transmission 15 and are connected by oppositely extending universal drive shaftings 54 and 55 respectively, to gear housings 56 arranged at one side of the vehicle body, as shown in Fig. 3. These gear housings are suitably rigidly secured to the adjacent side of the vehicle body and each includes, as shown in Fig. 9, a drive shaft 57 having a beveled pinion 58 secured thereto and meshing with and driving a beveled gear 59, the latter, in turn, secured to a differential housing 60 having hub portions 61 suitably journaled within the gear housing 56. Beveled planet gears 62 of the differential are journaled on radial shafts 63 suitably supported within the differential housing and meshing with coaxial beveled gears 64 and 65 suitably journaled within the hub portions of the differential housing 60 (Fig. 9). These beveled gears 64 and 65 are keyed to the adjacent ends of aligned horizontal shafts 66 and 67 respectively, and the shaft 66 is suitably journaled within the gear housing 56 and has secured thereto a spur pinion 68 meshing with a spur gear 69 having its hub journaled within the gear housing 56 and keyed to a parallel shaft 70. The shaft 70 drives through a conventional universal joint structure 71 the hub 72 of the adjacent wheel. The wheel is mounted in a known manner on brackets 73 secured to the adjacent side of the vehicle body and these brackets provide an upright pivotal mounting, in alignment with the universal joint structure, whereby the wheel may be turned horizontally in the usual manner to effect steering. The steering gear connected to each traction wheel is conventional and is herein purposely omitted to facilitate illustration.

As shown in Fig. 10, the aligned cross shaft 67 extends transversely of the lower portion of the vehicle body beneath the bottom of the compartment and is arranged intermediate the upper and lower runs of the conveyor, and is suitably journaled in a gear housing 56' arranged at the opposite side of the body. This housing is similar to the housing 56 but, in this instance, the differential is omitted so that a pair of wheels is driven through a differential located at one side of the vehicle body. The shaft 67 is coupled at 74 to an aligned shaft 74' suitably journaled within the gear housing 56' (see Fig. 11), and secured to the shaft 74' is a spur pinion 68' meshing with a spur gear 69' likewise having its hub journaled within the gear housing 56' and similarly connected through a universal joint structure 71' to the adjacent traction wheel. The other pair of wheels is mounted and driven in an identical manner.

From the foregoing description, it will be evident that the pairs of front and rear wheels 3 and 4 may be concurrently driven and turned horizontally in unison about their swivel mountings, to effect propulsion and steering of the vehicle, and may be driven selectively at different predetermined speeds and in either direction at any speed through the selective transmission 15 while the electric motor 14 may run at a constant speed. Of course when an A.C. motor or a diesel engine is employed, a variable speed drive may also be effected by conventional appropriate control of the motor or engine as desired. It will be noted that the selective transmission 15 is arranged in a relatively low position on the vehicle body down between the front and rear wheels at one side of the body, in such manner as to provide direct drives with the wheels as well as to provide an extremely compact arrangement. The selective transmission 15 may include selective speed controlling clutches 75, 76 and 77 and forward and reverse clutches 78 and 79; each clutch having a hydraulic operator in the manner of the conveyor drive clutch above described in detail. Since this transmission may assume any appropriate form and does not per se enter into the present invention, further detail description thereof is herein considered unnecessary.

Driven by the motor 14 through the coupling or clutch 21 is a conventional fluid pump 80 and an electric generator 81, the latter being driven through a suitable belt and pulley connection 82 (see Fig. 8). This generator is connected by electric wiring 83 to the storage battery 16, as shown diagrammatically in Fig. 13 whereby charging of the battery may be effected. Also driven through an element of the selective transmission 15, through spur gearing 84 (Fig. 5) is a shaft 85 of an auxiliary fluid pump 86. The cable reel 11 is driven by a conventional hydraulic motor pump 87, and this motor pump may be operated in a known manner to drive the cable reel in a direction to wind in the power conductor cable 12 either when the vehicle is traveling or stationary, and may operate to cause the cable reel to rotate in unwinding direction with a predetermined resistance to rotation so as to maintain the conductor cable under the proper tension. The pump 80 is driven whenever the motor 14 (or the diesel engine) is operating and the pump 86 is driven through the transmission only when the vehicle is traveling so that, in effect, this pump is driven by the driving connections between the traction wheels and the electric motor 14. The pump 80 has its suction side connected by a conduit 88 to the liquid tank 18, and the discharge side of the pump is connected by conduit 90 to the intake side of the reel motor pump 87. The discharge side of the reel motor pump is connected by a return conduit 91 back to the tank 18. A branch conduit 92 leads from the conduit 90, beyond a check valve 93, to a valve device 94, and a conduit 95 leads from this valve device back to the conduit 90, beyond a check valve 96. A relief valve 97, located in the conduit 90 between the check valves 93 and 96, is connected by a relief conduit 98 back to the return conduit 91. Thus, when the motor 14 is running the pump 80 may supply liquid under pressure through conduit 90 under the control of a reel drive regulating valve 99, to the reel motor pump 87. The pump 86 is reversible, depending upon the direction of travel of the vehicle and the direction of rotation of the driving connections between the wheels and the electric motor 14. The pump 86 has conduits 100 and 101 connected to its opposite sides and leading to conduits 102 and 102' respectively, the latter containing pairs of check valves 103, 104 and 105, 106. The conduits 102 and 102' are connected, beyond the check valves 105 and 106, to a pressure conduit 107 leading to the valve device 94, and conduits 102 and 102' are connected, beyond the check valves 103 and 104, to a supply conduit 108 leading from the tank 18.

Thus, from the foregoing it is evident that when the vehicle is traveling in either direction the pump 86 may supply liquid under pressure through the conduit 107 to the valve device 94 and thence to the reel motor pump 87 to drive the reel. When the vehicle is stationary the pump 80 may supply liquid under pressure to the reel motor pump 87 and to the other hydraulically operated elements of the vehicle including the clutch operating pistons. Thus, when the vehicle is stationary and the demands on the hydraulic system are relatively small, the pump 80 serves adequately to meet the demands, and when a large volume of hydraulic pressure is needed during traveling of the vehicle the pump 86, driven by the driving connections between the vehicle wheels and the electric motor 14, serves to supplement the liquid pressure supply. By such an arrangement the need for by-passing a large volume of liquid under pressure, with its inherent power losses, is avoided.

A branch conduit 110, containing a pressure reducing valve 111, leads from the conduit 90, between the check valve 93 and the relief valve 97, to valve devices 112, 113, 114, which are embodied in the control apparatus 19 and are operated by solenoids 116. Valve device 115 is connected to a port of valve device 114 and is also operated by a solenoid 116. The valve devices 113 and 112 are the forward and reverse control valves and are connected by conduits 118 and 117 respectively, to the forward and reverse clutches 78 and 79. The valve devices 114 and 115 control the selective operation of the speed controlling clutches 75, 76 and 77. The device 114 is connected by conduit 119 to the clutch 77 and the device 115 is connected by conduits 120 and 121 to the clutches 75 and 76 respectively. An operator controllable member 123, desirably a foot pedal located at the operator's station, is positionable to actuate switches 124 and 125 which control the energization of the solenoids 116 which in turn operate the valve devices 113 and 112 for the forward and reverse clutches, and a selector switch 126, having a shiftable operator 127, controls the energization of the solenoids 116 of the speed control valve devices 114 and 115. An electric line 131 leads from the positive side of the battery 16 to branch lines connected to the coils of the solenoids 116 of the valve devices 112, 113, 114 and 115, and lines 132 and 133 lead from the solenoids of the devices 113 and 112 to the forward and reverse switches 124 and 125. An electric line 134 leads from the negative side of the battery, and a line 135 connects the negative line 134 with the forward and reverse switches. Lines 138 and 139 lead from the selector switch 126 to the solenoids 116 which operate the valve devices 114 and 115. Thus, when the forward drive switch 124 is closed the solenoid 116 is energized to actuate the valve device 113 controlling the clutch 78, and the selector switch 126 may then be positioned to effect energization of the desired one of the solenoids 116 selectively to operate the valve devices 114 and 115 which control the low, intermediate or high speed clutches. When reverse drive at any one of the three speeds indicated is desired the reverse control switch 125 may be closed thereby to energize the solenoid which controls the valve device 112 thereby to apply the reverse drive clutch 79, while the forward drive clutch 78 is released due to the opening of the switch 124.

The electric motor 14 may be controlled by any suitable control means, the current being supplied to motor 14 through cable 12 wound on cable reel 11.

As shown in Fig. 13 a conduit 169 leads from the conduit 110 to a manual control valve device 170, and the conduit 43 of the hydraulically operated conveyor clutch 29 is connected to this valve device so that the conveyor may be started or stopped under the control of the operator.

As a result of this invention an improved mine haulage vehicle is provided which may be propelled and controlled in an improved manner. By the provision of the single prime mover and the selective multi-speed transmission, by which the traction wheels, the conveyor and the pressure generating means are driven, a vehicle which is extremely compact and simple in construction is made possible. The novel controls for the transmission together with the improved hydraulic and electrical systems and the improved motor controlling means, efficiency in operation and ease of control are attained. By the provision of the hydraulic system embodying the two relatively small pumps, power losses are substantially reduced and simplification and greater compactness are made possible. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

I claim:

1. In a vehicle, a mobile body, supporting and propelling means for said body, an electric motor for driving said supporting and propelling means, driving connections between said motor and said supporting and propelling means, an electric cable reel rotatably mounted on said body and having a power conductor cable wound thereon for supplying electric power to said motor, a reversible pump for generating liquid under pressure, means connecting said pump to said driving connections so that said pump generates liquid under pressure only when said vehicle is traveling, a hydraulic motor for driving said reel, and means for conducting liquid under pressure from said pump to said reel motor irrespective of the duration of travel of said vehicle.

2. In a vehicle, a mobile body, supporting and propelling means for said body, an electric motor for driving said supporting and propelling means, driving connections between said motor and said supporting and propelling means, an electric cable reel rotatably mounted on said body and having a power conductor cable wound thereon for supplying electric power to said motor, a pump for generating liquid under pressure, means connecting said pump to said driving connections so that said pump generates liquid under pressure only when said vehicle is traveling, a hydraulic motor for driving said reel, means for conducting liquid under pressure from said pump to said reel motor, and a second pump driven by said motor for supplying liquid under pressure to said reel motor when the vehicle is stationary and said first mentioned pump is inactive.

3. In a vehicle, a mobile body, an electric driving motor on said body, an electric cable reel rotatably mounted on said body for conducting electric power to said motor, a hydraulic motor for driving said cable reel, means driven by said electric motor for propelling said body in either direction, and a reversible pump driven by said first named means for supplying liquid under pressure to said reel motor irrespective of the direction of travel of the vehicle.

4. In a vehicle, the combination comprising a mobile body, propelling means for said body, a selective multi-speed transmission, an electric motor for driving said transmission, driving connections between said electric motor and said transmission, second driving connections between said transmission and said propelling means, a unidirectional pump driven by said motor, an electric cable reel rotatably mounted on said body for supplying electric power in said motor, a hydraulic motor for driving said reel, and a reversible pump driven by said transmission, said first pump adapted to supply liquid under pressure to said reel motor for operating the latter when the vehicle is stationary and said second pump adapted to supplement the liquid pressure supply to said reel motor when the vehicle is traveling irrespective of the direction of travel of said vehicle.

5. In a vehicle, a mobile body, a prime mover on said body, means including a selective multi-speed transmission driven by said prime mover for propelling said body in either direction, means responsive to fluid pressure, and a reversible pump driven by said first named means for supplying fluid under pressure to said responsive means irrespective of the direction of travel of the vehicle.

6. In a vehicle, the combination comprising a mobile body, propelling means for said body, a selective multi-speed transmission, a prime mover for driving said transmission, driving connections between said prime mover and said transmission, second driving connections between said transmission and said propelling means, unidirectional fluid pressure generating means driven by said prime mover, reversible second fluid pressure generating means driven by said transmission, and means responsive to fluid under pressure, said first pressure generating means adapted to supply fluid under pressure to said responsive means when the vehicle is stationary and said second pressure generating means adapted to supplement the fluid pressure supply to said responsive means when the vehicle is traveling irrespective of the direction of travel of said vehicle.

7. In a haulage vehicle a mobile body, supporting and propelling means for said body, an electric motor for driving said supporting and propelling means, driving connections between said electric motor and said supporting and propelling means, an electric cable reel rotatably mounted on said body and having a power conductor cable wound thereon for supplying electric power to said motor, a first pump connected to said electric motor and adapted to generate liquid under pressure upon actuation of said electric motor, a reversible second pump for generating liquid under pressure, said second pump adapted to generate liquid under pressure in response to the actuation of said driving connections irrespective of the direction of travel of said vehicle, a hydraulic motor for driving said reel, and means for conducting liquid under pressure from said first pump and second pump to said hydraulic motor.

8. In a device of the character described the combination comprising a vehicle having a mobile body, supporting and propelling means for said body, a prime mover for driving said supporting and propelling means, driving connections between said prime mover and said supporting and propelling means, said driving connections including a multi-speed forward and reverse transmission, means responsive to fluid pressure, a fluid storage tank, a unidirectional first pump connected to said prime mover and adapted to generate fluid under pressure upon actuation of said prime mover, a first fluid supply conduit connecting the inlet of said first pump to said storage tank, a first pressure conduit connecting the outlet of said first pump to said fluid pressure responsive means, a check valve in said first pressure conduit, a reversible second pump, said second pump adapted to generate liquid under pressure in response to the actuation of said driving connections irrespective of the direction of travel of said vehicle, said second pump having a first port and a second port, a second pressure conduit connected at one end to said first pressure conduit between said check valve and fluid pressure responsive means and at the other end to a pair of parallel conduits, said pair of parallel conduits each having pair of check valves positioned therein, a second fluid supply conduit connecting said pair of parallel conduits to said fluid supply tank, a first intermediate conduit connected at one end to said second pump first port and at the other end to one of said parallel conduits between said pair of check valves positioned therein, and a second intermediate conduit connected at one end to said second pump second port and at the other end to said other parallel conduit between said check valves positioned therein, said first and second intermediate conduits operable to serve as either supply conduits or pressure delivery conduits for said second pump depending upon the direction of travel of said vehicle.

9. In a cable reeling mechanism adapted to supply power to a moving vehicle the combination comprising a vehicle having a mobile body, supporting and propelling means for said body, an electric motor for driving said supporting and propelling means, driving connections between said electric motor and said supporting and propelling means, said driving connections including a multi-speed forward and reverse transmission, an electric cable reel rotatably mounted on said body and having a power conductor cable wound thereon for supplying electric power to said electric motor, a hydraulic motor for driving said reel, a fluid storage tank, a unidirectional first pump connected to said motor and adapted to generate fluid under pressure upon actuation of said electric motor, a first fluid supply conduit connecting the inlet of said first pump to said storage tank, a first pressure conduit connecting the outlet of said first pump to said hydraulic motor, a check valve in said first pressure conduit, a reversible second pump connected to said transmission and adapted to generate liquid under pressure upon actuation of said transmission irrespective of the direction of travel of said vehicle, said second pump having a first port and a second port, a second pressure conduit connected at one end to said first pressure conduit between said check valve and said hydraulic motor and at the other end to a pair of parallel conduits each having a pair of check valves positioned therein, a second fluid supply conduit connecting said pair of parallel conduits to said fluid supply tank, a first intermediate conduit connected at one end to said second pump first port and at the other end to one of said parallel conduits between said pair of check valves positioned therein, a second intermediate conduit connected at one end to said second pump second port and at the other end to said other parallel conduit between said check valves positioned therein, said first and second intermediate conduits operable to serve as either supply conduits or pressure delivery conduits for said second pump depending upon the direction of travel of said vehicle.

10. In a vehicle, the combination comprising a mobile body, propelling means for said body, a selective multi-speed transmission, a prime mover for driving said transmission, driving connections between said prime mover and said transmission, second driving connections between said transmission and said propelling means, reversible fluid pressure generating means driven by said transmission, and means responsive to fluid under pressure, said fluid pressure generating means adapted to supply fluid under pressure to said responsive means when said vehicle is traveling irrespective of the direction of travel of said vehicle.

References Cited in the file of this patent

UNITED STATES PATENTS

| | | |
|---|---|---|
| 2,229,086 | Joy | Jan. 21, 1941 |
| 2,467,238 | Slomer | Apr. 12, 1949 |
| 2,487,618 | Twyman | Nov. 8, 1949 |
| 2,562,881 | Boldwin | Aug. 7, 1951 |
| 2,586,682 | McLeod | Feb. 19, 1952 |